United States Patent
Stec et al.

(10) Patent No.: US 10,742,904 B2
(45) Date of Patent: Aug. 11, 2020

(54) MULTISPECTRAL IMAGE PROCESSING SYSTEM FOR FACE DETECTION

(71) Applicant: FotoNation Limited, Galway (IE)

(72) Inventors: Piotr Stec, Galway (IE); Petronel Bigioi, Galway (IE)

(73) Assignee: FotoNation Limited, Galway (IE)

( * ) Notice: Subject to any disclaimer, the term of this patent is extended or adjusted under 35 U.S.C. 154(b) by 15 days.

(21) Appl. No.: 15/990,519

(22) Filed: May 25, 2018

(65) Prior Publication Data

US 2019/0364229 A1    Nov. 28, 2019

(51) Int. Cl.
| | |
|---|---|
| *H04N 5/33* | (2006.01) |
| *G06K 9/00* | (2006.01) |
| *G06K 9/20* | (2006.01) |
| *H04N 5/225* | (2006.01) |
| *H04N 5/353* | (2011.01) |

(52) U.S. Cl.
CPC ......... *H04N 5/332* (2013.01); *G06K 9/00255* (2013.01); *G06K 9/00604* (2013.01); *G06K 9/00617* (2013.01); *G06K 9/2027* (2013.01); *H04N 5/2256* (2013.01); *H04N 5/3532* (2013.01); *G06K 9/00845* (2013.01); *G06K 9/00885* (2013.01); *G06K 2009/00939* (2013.01)

(58) Field of Classification Search
None
See application file for complete search history.

(56) References Cited

U.S. PATENT DOCUMENTS

| | | | |
|---|---|---|---|
| 8,345,936 B2 * | 1/2013 | Burge | G06K 9/2018 |
| | | | 382/117 |
| 2007/0147811 A1 * | 6/2007 | Nakao | G06K 9/00604 |
| | | | 396/18 |

(Continued)

FOREIGN PATENT DOCUMENTS

| | | |
|---|---|---|
| EP | 2052347 B1 | 4/2011 |
| EP | 3066690 | 5/2015 |

(Continued)

OTHER PUBLICATIONS

A. K. Jain, A. Ross, and S. Prabhakar, "An introduction to biometric recognition," IEEE Trans. Circuits Syst. Video Technol., vol. 14, 2004, 17 pages.

(Continued)

*Primary Examiner* — Kate H Luo
(74) *Attorney, Agent, or Firm* — Lee & Hayes, PC

(57) ABSTRACT

An image processing system comprises at least one image sensor comprising a plurality of sub-pixels, and configured to provide a first image plane from a group of first sub-pixels selectively sensitive to a first NIR light band and a second image plane from a group of second sub-pixels selectively sensitive to a second NIR light band. An NIR light source is capable of separately emitting first NIR light corresponding to the first NIR light band and second NIR light corresponding to the second NIR light band. The system can be configured to operate according to at least a first working mode where a face detector is configured to detect at least a first face in the first image plane and a second face in the second image plane at a spatially non-coincident location to the first face.

19 Claims, 2 Drawing Sheets

(56) References Cited

U.S. PATENT DOCUMENTS

| | | | | |
|---|---|---|---|---|
| 2013/0228687 | A1* | 9/2013 | Vincent | B82Y 20/00 |
| | | | | 250/339.01 |
| 2013/0329101 | A1* | 12/2013 | Choi | H04N 9/045 |
| | | | | 348/273 |
| 2014/0153823 | A1* | 6/2014 | Lee | G06T 3/4015 |
| | | | | 382/167 |
| 2015/0304535 | A1* | 10/2015 | Smits | G06T 7/90 |
| | | | | 348/78 |
| 2016/0092731 | A1* | 3/2016 | Dainty | G06K 9/00604 |
| | | | | 348/78 |
| 2017/0330025 | A1* | 11/2017 | Ono | G06K 9/209 |
| 2017/0344793 | A1* | 11/2017 | Xue | H04N 5/23219 |
| 2017/0366761 | A1* | 12/2017 | Dainty | H04N 5/2253 |

FOREIGN PATENT DOCUMENTS

| | | |
|---|---|---|
| WO | 2007/106117 A2 | 9/2007 |
| WO | 2011/124512 A2 | 10/2011 |

OTHER PUBLICATIONS

J. Daugman, "New methods in iris recognition," IEEE Trans. Syst. Man. Cybern. B. Cybern., vol. 37, pp. 1167-1175, 2007.

Abbas El Gamal"High Dynamic Range Image Sensors," Stanford University, ISSCC'02 (www.cafe.stanford.edu/~abbas/group/papers_and_pub/isscc02_tutorial.pdf) 62 pages.

P. Lapray et. al, "Multispectral Filter Arrays: Recent Advances and Practical Implementation," Sensors 2014, 14(11), 21626-21659.

www.lifehacker.com/the-webcam-pulse-detector-shows-your-life-signs-using-y-1704207849, 2 pages.

www.people.csail.mit.edu/mrub/vidmag, 3 pages.

Hamad Monkaresi, et al. "A Machine Learning Approach to Improve Contactless Heart Rate Monitoring Using a Webcam".

Bigioi, P., U.S. Appl. No. 62/592,665 titled "Peripheral processing device", filed Nov. 30, 2017, 30 pages.

European Patent Office, "Extended European Search Report" dated Oct. 11, 2019 in EP Patent Application No. 19162767.8 filed Mar. 14, 2019 and titled "A Multispectral Image Processing System for Face Detection", 10 pages.

Pereira Manuela, et al.: "Automatic face recognition in HDR imaging", Visual Communicataion and Image Processing, Jan. 20, 2004- Jan. 20, 2004; San Jose, vol. 9138, May 15, 2014 (May 15, 2014), pp. 913804-1 to 913804-10, XP060030332, DOI: 10.1117/12.2054539, ISBN: 978-1-62841-730-2.

Thirimachos Bourlai: "Face Recognition Across the Imaging Spectrum—preface and index" in: "Face Recognition Across the Imaging Spectrum", Feb. 12, 2016 (Feb. 12, 2016), Springer, XP055628016, pp. v-ix, DOI: 10.1007/978-3-319-28501-6.

Nayar S K et al: "High Dynamic Range Imaging: Spatially Varying Pixel Exposures", Proceedings 2000 IEEE Conference on Computer Vision and Pattern Recognition. CVPR 2000. Hilton Head Island, SC, Jun. 13-15, 2000; [Proceedings of the IEEE Computer Conference on Computer Vision and Pattern Recognition], Los Alamitos CA,: IEEE Comp., Jun. 13, 2000 (Jun. 13, 2000), pp. 472-479, XP002236923,ISBN: 978-0-7803-6527-8.

* cited by examiner

MULTISPECTRAL IMAGE PROCESSING SYSTEM FOR FACE DETECTION

FIELD

The present invention relates to a multispectral image processing system for face detection and applications based on such face detection.

BACKGROUND

Face detection and tracking in real-time is well known in image processing, for example as described in European Patent No. EP2052347 (Ref: FN-143). These techniques enable one or more face regions within a scene being imaged to be readily delineated and to allow for subsequent image processing based on this information.

Such image processing can include face recognition which attempts to identify individuals being imaged; auto-focussing by bringing a detected and/or selected face region into focus; or defect detection and/or correction of the face region(s).

Concerning individual identification based on face features, A. K. Jain, A. Ross, and S. Prabhakar, "An introduction to biometric recognition," IEEE Trans. Circuits Syst. Video Technol., vol. 14, 2004 discloses that the iris of the eye is a near-ideal biometric. Typically, an image of an iris is best acquired in a dedicated imaging system that uses infra-red (IR) illumination, typically near infra-red (NIR) above 700 nm.

The iris regions are typically extracted from identified eye regions and a more detailed analysis may be performed to confirm if a valid iris pattern is detectable. For example, J. Daugman, "New methods in iris recognition," IEEE Trans. Syst. Man. Cybern. B. Cybern., vol. 37, pp. 1167-1175, 2007 discloses a range of additional refinements which can be utilized to determine the exact shape of iris and the eye-pupil. It is also common practice to transform the iris from a polar to rectangular co-ordinate system, although this is not necessary.

Detecting and tracking eyes or iris regions can also be used for determining gaze or a person's condition, such as fatigue or other health condition, which is especially useful in driver monitoring systems (DMS) integrated in vehicles.

Separately, most cameras and smartphones can identify specific patterns, such as 'eye-blink' and 'smile' in real-time tracked faces, and the timing of main image acquisition can be adjusted to ensure subjects within a scene are in-focus, not blinking or are smiling such as disclosed in WO2007/106117 (Ref: FN-149).

A common problem when capturing images within a scene is limited system dynamic range when acquiring differently illuminated subjects. In particular, regions of acquired images corresponding to bright regions of a scene tend to be overexposed, while regions of acquired images corresponding to dark regions of a scene tend to be underexposed.

This problem can particularly effect the acquisition with active illumination of faces within a scene extending over a significant depth of field within the scene, such as faces of occupants disposed at different rows within a vehicle being imaged from a camera located towards the front of the vehicle, for example, near a rear-view mirror. In particular, if the exposure is set for acquiring properly exposed images of faces near to the camera (which are more illuminated by a light source), the acquired images of faces distant from the camera (which are less illuminated by the light source) tend to be underexposed. Vice versa, if the exposure is set for acquiring properly exposed images of the distant faces, the images of the nearer faces tend to be overexposed.

A known solution to acquire an image with high dynamic range (HDR) is to capture a sequence of consecutive images of the same scene, at different exposure levels, for example, by varying the exposure time at which each image is acquired, wherein shorter exposure times are used to properly capture bright scene regions and longer exposure times are used to properly capture dark scene regions. The acquired images can be then combined to create a single image, where various regions within the scene are properly exposed.

It can be readily appreciated how this solution can be quite satisfactorily applied to scenes with static subjects, such as landscapes, while being impractical for capturing faces which are relatively close to the camera and which can move during consecutive image acquisitions, thus causing artefacts when attempting to construct an image of the scene. It should also be noted that it is not possible to acquire such sequences of variably exposed images using rolling shutter techniques.

From "High Dynamic Range Image Sensors," by Abbas El Gamal, Stanford University, ISSCC'02 (http://cafe.stanford.edu/~abbas/group/papers and pub/isscc02_tutorial.pdf) it is further known to use an HDR CMOS image sensor with spatially varying pixel sensitivity. In particular, an array of neutral density (ND) filters is deposited on the image sensor so that, in a single captured image of a scene, sensor pixels associated with darker filters can be used to acquire bright regions of the scene and sensor pixels associated with lighter filters can be used to acquire dark regions of the scene. However, this document is not concerned about face acquisition and detection across an extensive depth of field within a scene, especially when using active IR illumination.

SUMMARY

According to aspects of the present invention, there are provided image processing systems according to claims 1, 15 and 16.

Embodiments of these systems are based on employing an image sensor with multiple groups of sub-pixels, each configured to substantially simultaneously acquire, at different NIR light bands and with different sensitivity, image planes for a given scene. The image sensor is employed in cooperation with at least one active NIR illumination source capable of emitting NIR light matching the NIR light bands of the respective groups of sub-pixels.

Notably, in embodiments of the system according to claims 1 and 15, using a larger and more sensitive group of sub-pixels in cooperation with a matching higher intensity emitted NIR light allows for the acquisition of properly exposed images of faces farther from the system (which due to the greater distance from the NIR illumination source would tend to be poorly illuminated and, therefore, underexposed), and using a less sensitive group of fewer sub-pixels in cooperation with a matching lower intensity emitted NIR light allows for the concurrent acquisition of properly exposed images of faces closer to the system (which due to the proximity to the NIR illumination source would tend to be over illuminated and, therefore, overexposed).

As such, this combination of features allows a natural balance of the exposure levels for properly acquiring faces (i.e. with a required level of face detail) at different depths into an imaged scene, thus achieving a greater acquisition dynamic range than employing a typical single wavelength image processing system.

These embodiments are advantageously capable of operating in a first working mode for detecting faces at different depths within a scene with an increased accuracy, but they can also provide advantages when operating according to a second working mode for heart pulse monitoring.

Indeed, images of a given detected face, that can be acquired from the differently sensitive groups of sub-pixels, can be used to analyse a differential signal indicative of a difference in illumination between the acquired face images over a sequence of acquisition periods.

In this differential monitoring approach, superficial illumination variations of the monitored face due to factors unrelated to the heart pulse rate, such a change in environment illumination or motion of the monitored person, will affect in the same way the face images acquired from the differently sensitive groups of sub-pixels and, therefore, will tend to be mutually cancelled in the monitored differential signal.

In some embodiments, the system can switch from the first working mode to the second working mode subject to an adjustment of the acquisition settings for acquiring properly exposed images of the same face from the differently sensitive groups of sub-pixels.

Embodiments of the system of claim 16 can implement the differential pulse rate monitoring separately from the capability to properly acquire images of faces at different scene depths. As such, these embodiments can be provided without features specifically provided for compensating for the exposure levels of faces at different distances from the system, such as having a different number of sub-pixels in the differently sensitive groups of sub-pixels and/or emitting the corresponding matching NIR lights with a different intensity.

According to other aspects of the presented invention, there are provided a portable electronic device or a vehicle occupant monitoring system including systems according to the above aspects.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
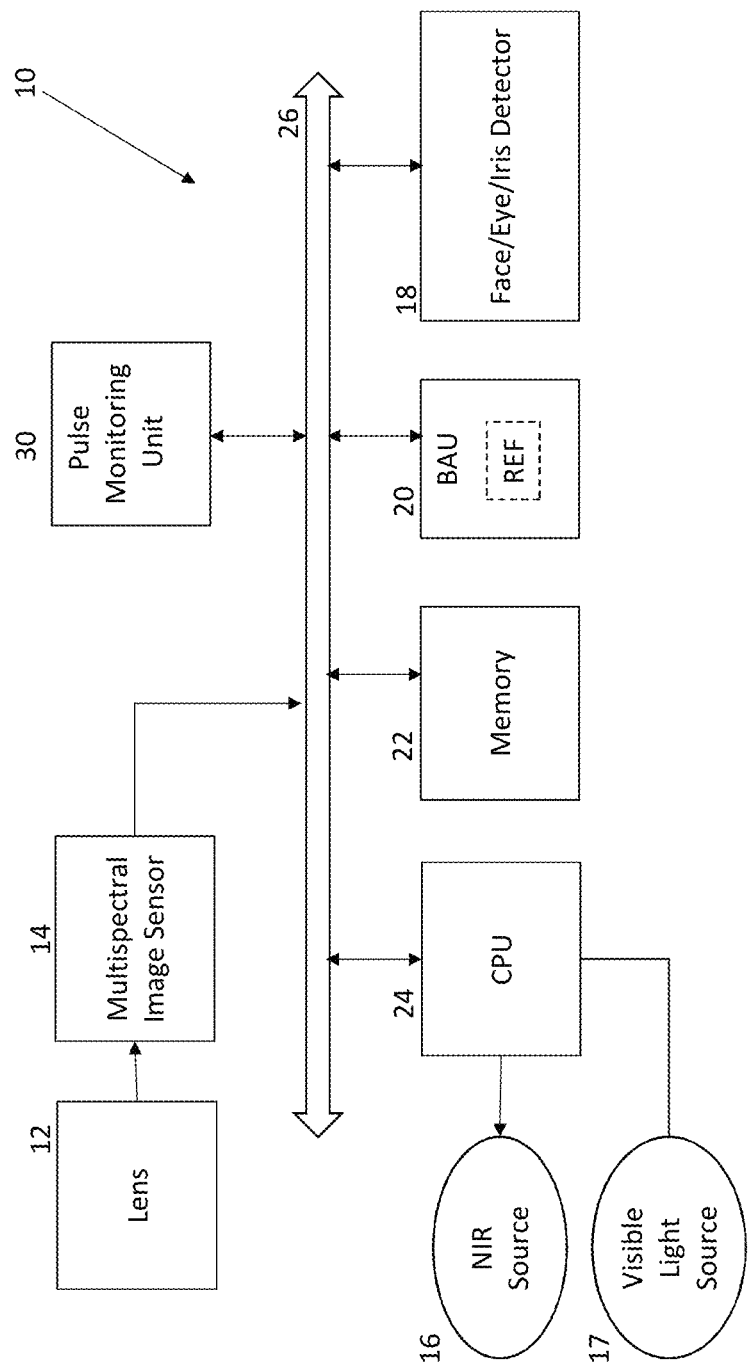
FIG. 1 shows an image processing system according to an embodiment of the present invention.

Referring now to FIG. 1 there is shown an image processing system 10 according to an embodiment of the present invention.

The system 10, which may be integrated within a portable device, for example, a camera, a smartphone, a tablet or the like, or be integrated into a vehicle safety system such as a driver monitoring system (DMS), comprises at least one central processing unit (CPU) 24, which typically runs operating system software as well as general purpose application software. For example, in a portable device, CPU 24 can run camera applications, browser, messaging, e-mail or other apps. In a vehicle safety system, CPU 24 can run camera applications dedicated to monitor a status of a driver or other occupants, especially for determining the health or attentiveness of an occupant.

The operating system may be set so that users must authenticate themselves to unlock the system and to gain access to applications installed on the system; or individual applications running on the system may require a user to authenticate themselves before they gain access to sensitive information.

The system 10 further comprises at least one NIR illumination source 16 and, in some embodiments, at least one visible light illumination source 17 capable of actively illuminating a scene in front of the system 10, and a lens assembly 12 capable of focusing the light reflected from the illuminated scene to an image sensor 14.

In the embodiment, the sensor 14 is a multispectral filter array image sensor capable of substantially simultaneously acquiring multiband images planes of the illuminated scene during an image acquisition period. An overview of using multispectral filter arrays for simultaneously acquiring multiband visible and NIR images, as well as other multispectral imaging acquisition techniques, is provided for example in P. Lapray et. al, "Multispectral Filter Arrays: Recent Advances and Practical Implementation," Sensors 2014, 14(11), 21626-21659.

Figures 2, 3:
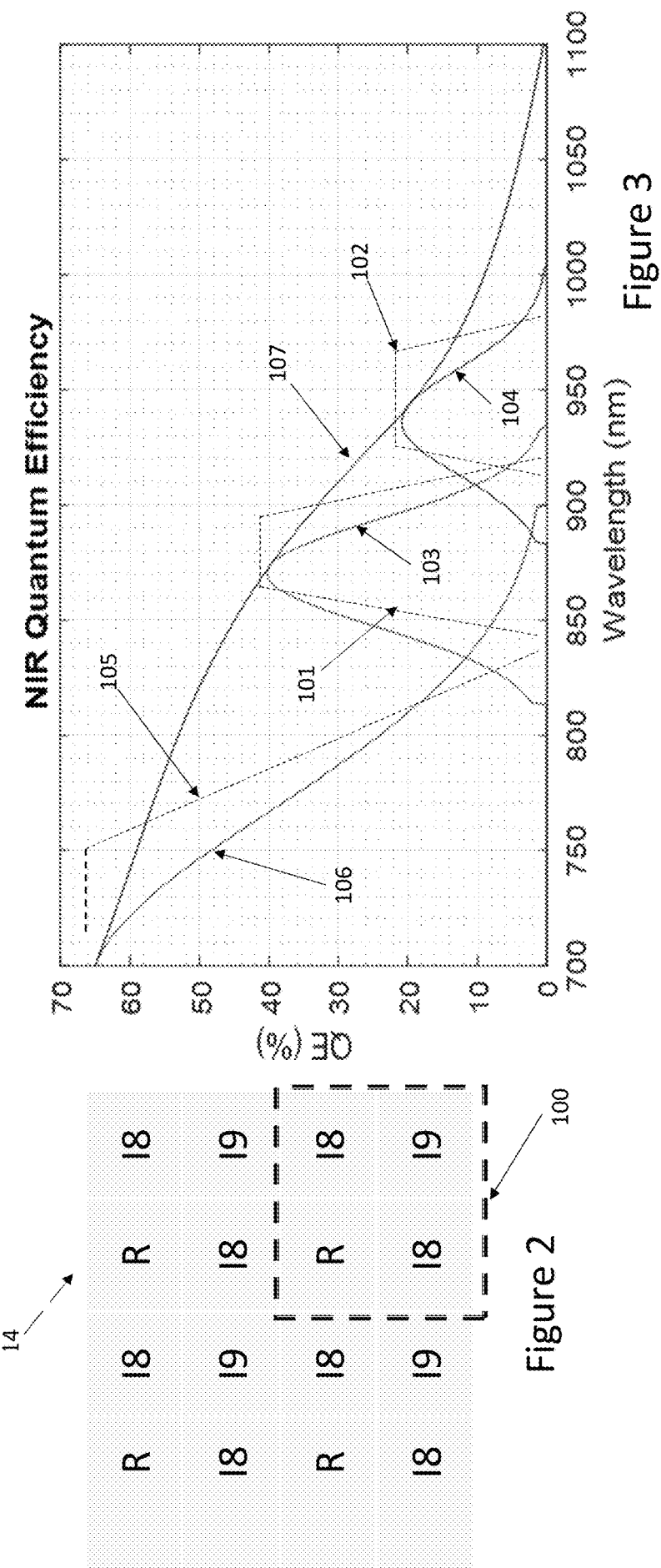
FIG. 2 shows a multispectral filter array image sensor according to an embodiment of the present invention, having three groups of sub-pixels associated to respective different band-pass filters.
FIG. 3 shows the frequency responses of the band-pass filters associated to the sub-pixel groups of the sensor illustrated in FIG. 2, as well as matching LED emission bands and the relative pixel sensitivity.

With reference to FIG. 2, the sensor 14 includes an array of pixels 100 and is formed by a multispectral filter array (MSFA) mounted on or disposed close to a common image CMOS sensor, so as to filter incoming light before it can reach the CMOS sensor.

The MSFA is patterned so as to resemble a typical Bayer pattern arrangement and comprises, for each sensor pixel 100: a spectral band-pass filter for passing a lower NIR light band centred around a wavelength of 875 nm to sub-pixels I8, a spectral band-pass filter for passing a higher NIR light band centred around a wavelength of 950 nm to sub-pixels I9, and a spectral filter for passing a visible bright Red light band centred around a wavelength of 700 nm to sub-pixels R.

Also, with reference to FIG. 3, each pixel 100 includes: two sub-pixels I8 which are sensitive to the NIR light band passed by filter with a passband 101, one sub-pixel I9 which is sensitive to the NIR light band passed by a corresponding filter with a passband 102, and one sub-sub-pixel R which is sensitive to the Red light band passed by a corresponding filter with a passband 105. Thus, the ratio between the number of sub-pixels I8 and sub-pixels I9 (as well as between the number of sub-pixels I8 and sub-pixels R) within the array of pixels 100 is 2:1.

The groups of sub-pixels I8, sub-pixels I9 and sub-pixels R provide three sensor channels for substantially simultaneously acquiring, during each image acquisition period, three respective image planes of the illuminated scene at different wavelength bands.

As known from, for example, P. Lapray et. al referenced above, the quantum efficiency (QE) of the CMOS sensor substantially decreases as the wavelength of incident radiation increases.

As illustrated in FIG. 3, such a QE variation 107 results in a sensitivity of the sub-pixels I8 to the incident NIR light band passed at the filter passband 101 being substantially double the sensitivity of the sub-pixels I9 to the incident NIR light band passed at the filter passband 102.

The relative sensitivity of the sub-pixels I8 and I9 can be further controlled by combining the respective band-pass filters 101, 102 with additional absorption filters, for example disposed within the lens assembly 12 or between the lens assembly 12 and the sensor 14. The sensitivity of the sub-pixels R can be controlled relative to the sensitivity of the sub-pixels I8 and I9 by using ND filters to match the range of the NIR pixels.

The lens assembly 12 is capable of focusing radiation towards the sensor 14 at all the passbands 101, 102, 105. For example, the lens of the assembly 12 can be of an apochromatic type tuned to the pass-bands 101, 102, 105. This results in proper focusing images of the illuminated scene on the sensor plane, for all the wavelengths of interest.

With reference back to FIG. 3, the NIR illumination source 16 comprises at least a first LED, or an array of first LEDs, having a NIR emission band 103 centered around the 875 nm wavelength and matching the passband 101, and a second LED, or an array of second LEDs, having a NIR emission band 104 centred around the 950 nm wavelength and matching the passband 102.

In the embodiment, the passbands 101 and 102 are narrower and sharper than the corresponding LED emission bands 103 and 104. In this way, although the LED emission bands 103 and 104 are partially overlapped at their edges, the LED emitted NIR light passed by the respective filter and directed to the sub-pixels I8 is properly separated from the LED emitted NIR light passed by the filter and directed to the sub-pixels I9. This results in a cross-talk reduction between the sensor channels provided by the sub-pixels I8 and I9.

Nevertheless, in the context of present disclosure "to match" encompasses all the cases where the LED emission bands 103, 104 includes wavelengths falling within the passbands 101, 102, including the case where the emission bands 103, 104 substantially coincide with or are narrower than the passbands of the respective passbands 101, 102.

The first and second LEDs can be driven at different power levels by a dedicated circuitry controllable by the CPU 24, in such a way that the intensity of the emitted NIR light 103 is higher than the intensity of the emitted NIR light 104. As such, the first and second LEDs can be separately controlled with less leakage and less overlap between their emission bands 103, 104, thus further improving the cross-talk reduction between channels.

The visible light illumination source 17 includes a LED, or an array of LEDs, having a bright Red light emission band 106 centered around the 700 nm wavelength and matching the passband 105. Preferably, the passband 105 is narrower and sharper than the corresponding LED emitted band 106.

With reference now back to FIG. 1, image data acquired, at each acquisition period, from the multiband channels provided by the sub-pixels I8, I9 and R can be written into a system memory 22 across the system bus 26 as required either by applications being executed by the CPU 24 or other dedicated processing blocks which have access to the image sensor 14 and/or memory 22.

In the embodiment, the system 10 further comprises a dedicated face detector 18 for identifying a face region from the image planes acquired through the multiband sensor channels. This functionality could equally be implemented in software executed by the CPU 24. The data for the identified faces may also be stored in the system memory 22 and/or other memories such as secure memory or databases belonging to or separate from the system 10.

In particular, the system 10 is especially adapted to operate face detection according to a first working mode, where the detector 18 is used for detecting and tracking faces at different depths within the illuminated scene using the NIR sensor channels provided by the sub-pixels I8 and the sub-pixels I9.

Indeed, the lower sensitivity and number of sub-pixels I9 and the lower intensity level of the emitted NIR light 104 cooperate to acquire properly exposed images of faces near to the system 10, such as the face of a vehicle driver and/or faces of occupants beside the driver, while the sub-pixels I8 will be mostly unaffected by the NIR light 104.

Concurrently, the higher sensitivity and number of sub-pixels I8 and the higher intensity level of the emitted NIR light 103 cooperate to acquire properly exposed images of faces distant from the system 10, such as faces of vehicle occupants behind the driver, while the sub-pixels I9 will be mostly unaffected by the NIR light 103.

Notably, having a larger number of sub-pixels I8 with respect to the number of sub-pixels I9 improves the resolution of the acquired images of distant faces, which are smaller and involve a greater distance travelled by the reflected NIR light to reach the system 10 than near faces.

Ultimately, this combination of features enables the acquisition of both distant and near faces with a required level of detail, so as they can be accurately identified by the detector 18.

For example, the detector 18 (or a pre-processor) can implement a dedicated de-mosaicing (de-bayering) module for reconstructing a full image from the image planes acquired from the sensor IR channels. This module is aware of the different sensitivity of and the different NIR bands 101, 102 associated to the sub-pixels I8 and the sub-pixels I9, and it can rely on a minimum maintained level of cross-correlation between the channels. It will be appreciated that in obtaining de-mosaiced images for near faces, the image components acquired in the NIR band 101 can be even ignored. This functionality could equally be implemented in software executed by the CPU 24 or other dedicated unit within the system 10.

Other image signal processing techniques can be customized for the sensor 14, and applied to the acquired images, such as gamma correction and dynamic range compression being aware of the properties of the sensor 14 for properly rendering faces at different distances.

In the embodiment, the detector 18 is further configured for identifying, within the detected distant and/or near faces, one or more eye regions and/or iris regions. This functionality could equally be implemented in software executed by the CPU 24. The data for the identified one or more iris regions may also be stored in the system memory 22 and/or other memories belonging to or separate from the system 10.

As such, the identified iris regions can be used as an input for a biometric authentication unit (BAU) 20. Preferably, the BAU 20 is configured for extracting an iris code from the received identified iris regions, and it may store this code in the memory 22 and/or other memories or databases belonging to or separate from the system 10. Further, the BAU 20 is preferably configured to compare the received one or more iris regions with reference iris region(s) associated with one or more predetermined subjects (such as an owner of a vehicle and members of his family), which can be stored in memory 22, within secure memory in the BAU 20 or in any location accessible to the BAU 20.

An exemplary way for performing iris code extraction and comparison between iris regions is disclosed in WO2011/124512 (Ref: FN-458) and this involves a comparison between two image templates using a master mask to select corresponding codes from the templates. The master mask excludes blocks from the matching process and/or weights blocks according to their known or expected reliability.

Other applications can benefit from the improved face detection provided by the system 10 operating in the first working mode, among which fatigue, glaze and face emotions detections, face auto-focussing or defect detection and/or correction.

The system of FIG. 1 can also operate according to a second working mode for heart pulse detection. As known, the dilation and contraction of the blood vessels corresponding to the heart rhythm causes a periodic variation in the colour of illuminated skin. Pulse detection applications typically monitor this periodic colour variation in skin portions of a tracked detected face, using only one visible colour acquisition channel.

An example of such applications is Webcam Pulse Detector which can work in cooperation with a PC webcam (https://lifehacker.com/the-webcam-pulse-detector-shows-your-life-signs-using-y -1704207849). Using visible light for pulse detection is often unreliable and detectability may vary with different skin colours. Furthermore, the reliability of the pulse detection is low in view of the fact that detected changes in colour can be affected by superficial skin colour changes due to factors unrelated to the pulse rate, such as environmental illumination and motion of the monitored person. For example, the skin shade varies across the face and if the person moves, those variations will exceed the variations due to the pulse rate making the detection unreliable. Eulerian Video Magnification can be applied to amplify the periodic colour variation visible in the face over consecutive frames of a video sequence (http://people.csail.mit.edu/mrub/vidmag/). Alternatively, neural network (NN) processing can improve the accuracy of camera-based pulse detection during a natural (i.e. not controller) human-computer interaction such as disclosed in "A Machine Learning Approach to Improve Contactless Heart Rate Monitoring Using a Webcam," by Hamad Monkaresi et al. Here, visible light is used and the acquired visual signal is not used directly in the pulse detection but processed and after independent component analysis.

In the second working mode of the present embodiment, the detector 18 is used for detecting and tracking a face of a person using the NIR sensor channels provided by the sub-pixels I8 and the sub-pixels I9, as well the Red light channel provided by the sub-pixels R as a support.

The switching from the first working mode to the second working mode can occur periodically or triggered by a specific command/event.

When switching from the first to the second working mode, the CPU 24 or another dedicated unit of the system 10 is capable of adjusting the image acquisition settings used in the first working mode for acquiring a properly exposed image of the same face in the different image planes provided by the sub-pixels I8 and the sub-pixels I9.

In particular, when the face tracked for pulse monitoring is near to the system 10 (such as in the case where the face belongs to a vehicle driver or an occupant beside the driver), one or a combination of the following adjustments is performed:
decrease the intensity of the LED-emitted NIR light 103, decrease the gain of the sub-pixels I8;
decrease the integration (exposure) time.

Note that using a different integration time for the pixels I8, I9 and R is not typically possible using a rolling shutter exposure.

In any case, in this way, a properly exposed image of the tracked face can be formed in the image plane acquired from the sub-pixels I8, concurrently with a properly exposed image of the same face in the image plane acquired form the sub-pixels I9.

When the face tracked for pulse monitoring is far from the system 10 (such as in the case where the face belongs to a vehicle occupant behind the driver), one or a combination of the following adjustments is performed:
increase the intensity of the LED-emitted NIR light 104, increase the gain of the sub-pixels I9;
increase the integration time.

In this way, a properly exposed image of the tracked face can be formed in the image plane acquired from the sub-pixels I9, concurrently with a properly exposed image of the face in the image plane acquired form the sub-pixels I8.

Additionally or alternatively, the relative exposure level between the NIR sensor channels provided by the sub-pixels I8 and the sub-pixels I9 can be controlled by using additional filters attenuating or amplifying the wavelengths of interest.

The CPU 24 can further adjust the image acquiring settings for the channel provided by the sub-pixels R for properly capturing the tracked face, especially in view of the distance of the face from the system 10. In particular, a lower intensity LED-emitted red light 106 and/or a lower gain of the sub-pixels R and/or a lower integration time can be set for a closer face, while a higher intensity LED-emitted red light 106 and/or a higher gain of the sub-pixels R and/or a higher integration time can be set for a farther face.

When returning to the first working mode, the CPU 24 or other dedicated unit is capable of returning to the image acquisition settings for the first working mode.

With reference now to FIG. 1, the system 10 further comprises a dedicated unit 30 for monitoring the heart pulse rate. This functionality could equally be implemented in software executed by the CPU 24.

In particular, the unit 30 can access the stored image data from the detector 18 operating in the second working mode, so as to have available for each one of a sequence of image acquisition periods:
the image data of the monitored face from the sub-pixels I8;
the image data of the monitored face from the sub-pixels I9; and
the image data of the monitored face from the sub-pixels R.

Thus, when all the three sensor channels are available, the unit 30 can track the evolving in time of the following three differential signals:

$$d_1(t)=|V(t)-I8(t)|$$

$$d_2(t)=|V(t)-I9(t)|$$

$$d_3(t)=|I9(t)-I8(t)|$$

wherein $I8(t)$ is a time signal indicative of the illumination of the monitored face as acquired over time from the sub-pixels I8, $I9(t)$ is time signal indicative of the illumination of the monitored face as acquired over time from the sub-pixels I9, and $V(t)$ is indicative of the illumination of the monitored face as acquired over time from the sub-pixels R.

Since the skin penetration depth depends on the wavelength of incident radiation, the dilation and contraction of the blood vessels caused by the heart rhythm will cause different illumination variations of the monitored face at the different bands of the sensor channels provided by the sub-pixels I8, I9 and R. On the other hand, superficial illumination changes due to other factors, e.g. a variation in the environment illumination or face motion, tend to substantially effect these multiband channels in the same way.

Thus, each of $d_1(t)$, $d_2(t)$ and $d_3(t)$ contains a non-zero component indicative of an illumination variation of the monitored face due to the pulse rate, while components within each of the signals $I8(t)$, $I9(t)$ and $V(t)$ which are due to other factors tend to mutually cancel in the calculated $d_1(t)$, $d_2(t)$ and $d_3(t)$.

As such, the differential signals $d_1(t)$, $d_2(t)$ and $d_3(t)$ provide a more reliable measurement for monitoring the pulse rate than just tracking illumination changes in one wavelength image acquisition channel. Furthermore, the pulse rate will be correlated with all the differential signals $d_1(t)$, $d_2(t)$ and $d_3(t)$, while the noise will be random. This aspect also means an increase of the measurement accuracy.

Using NIR light also improves the measurement, because IR light can penetrate the skin deeper and, therefore, permits better visualization of the blood vessels than using only visible light. Furthermore, IR light is especially suitable for monitoring the pulse rate of a vehicle driver, because in contrast with visible light it can substantially pass through sunglasses.

The role of signal R(t) is mainly of support, especially in view of the fact that the measurement conditions can change causing an overexpose or underexposure of the images acquired through the sensor channels. In case that the images from one of the channels are overexposed or underexposed, the other remaining two channels can be used for properly performing pulse detection.

Frequency detection algorithms can be applied to the differential signals $d_1(t)$, $d_2(t)$, $d_3(t)$ for monitoring the pulse rate, which can result in determining whether the pulse rate satisfies critical threshold levels or a calculation of the pulse rate values. For example, auto- and cross-correlation methods can be used, or other signal frequency detection methods e.g. involving Fourier transformations.

Alternatively, the heart pulse monitoring based on the differential signals $d_1(t)$, $d_2(t)$, $d_3(t)$ can be performed using an artificial neural network processing.

In variants of the above described embodiment, instead of using a MSFA mounted on the CMOS sensor, the lens assembly 12 can be configured to filter and split incident radiation into spectral bands separately focused on respective different regions of sub-pixels on a same sensor or group of sensors, which can be used for multispectral image acquisition. An example of such an arrangement, employing a plurality of lens barrels, is disclosed in European patent application No. EP3066690 (Ref: 10006-0035-EP-01).

Alternatively, the MSFA filtering functionality can be implemented by configuring groups of sub-pixels of the image sensor itself, for example, through suitable choice of materials, to be selectively and differently sensitive to respective different bands of incoming radiation.

In other variants of the above described embodiment, the sensor 14 can comprise more than two group of differently NIR sensitive pixels to properly acquire faces at more than substantially two levels of depth with the imaged scene, such as the case of a vehicle having more than two rows for occupants.

In other variants of the disclosed embodiment, the NIR illumination source 16 can comprise a single device capable of emitting different wavelengths including at least the emission band 103 matching the filter passband 101 associated with the sub-pixels I8 and the emission band 104 matching the filter passband 102 associated with the sub-pixels I9, e.g. a laser or flash source. The relative intensity of such bands within the emitted light can be controlled using spectral filters or masks included in or arranged close the emission opening of the light source.

In other variants of the disclosed embodiment, sub-pixels R can be replaced by sub-pixels sensitive to a different visible wavelength band, e.g. a green light band, or just by sub-pixels sensitive to white light. Nevertheless, it will be appreciated that the presence of sub-pixels for providing a visible light sensor channel is optional.

Although in the disclosed embodiment the system 10 is configured to switch between the first and second working modes, it can be appreciated that the functionalities associated with these working modes can be implemented separately in dedicated/separated image processing systems.

In this case, a system specifically dedicated for pulse rate monitoring can differ from the disclosed system 10 at least in that the number of subpixels I8 and I9 and/or the illumination intensities of the matching NIR lights can be the same.

It can be further appreciated that image processing functionalities of the disclosed system 10 can be implemented in a same processing unit, or a bank of processing units. Especially in case of application in a vehicle DMS, such image processing functionalities can be usefully implemented in the kind of multi-processor engine disclosed in U.S. provisional patent application No. 62/592,665 (Ref: FN-618), the disclosure of which is incorporated by reference.

The invention claimed is:

1. An image processing system comprising:
at least one image sensor comprising a plurality of pixels, each pixel comprising a plurality of sub-pixels, and configured to provide, during an image acquisition period, a first image plane from a group of first sub-pixels selectively sensitive to a first NIR light band and a second image plane from a group of second sub-pixels selectively sensitive to a second NIR light band, wherein the sensitivity of the first sub-pixels to the first NIR light is greater than the sensitivity of the second sub-pixels to the second NIR light band, and the number of first sub- pixels is greater than the number of second sub-pixels;
at least one NIR light source capable of separately emitting first NIR light corresponding to the first NIR light band and second NIR light corresponding to the second NIR light band, the first NIR light having a higher intensity than the second NIR light; and
a face detector configured to detect at least a first face from the first image plane and a second face from the second image plane, respectively, wherein the first face is a face of a first person and the second face is a face of a second person, different from the first person.

2. The image processing system of claim 1, comprising first spectral band-pass filters configured to pass light within the first NIR light band towards the first sub-pixels and second spectral band-pass filters configured to pass light within the second NIR light band towards the second sub-pixels.

3. The image processing system of claim 2, wherein said image sensor comprises a multispectral filter array including the first and second band-pass filters.

4. The image processing system of claim 1, wherein the first NIR light band and the second NIR light band are centered around a first wavelength and a second wavelength, respectively, the first wavelength being lower than the second wavelength.

5. The image processing system of claim 4, wherein the first wavelength is 875 nm and the second wavelength is 950 nm.

6. The image processing system of claim 1, wherein the at least one light source comprises at least one first LED configured to generate the first NIR light and at least one second LED configured to generate the second NIR light.

7. The image processing system of claim 1, further comprising an iris detector configured to detect at least one iris within the detected first face and to detect at least one iris within the detected second face.

8. The image processing system of claim 7, further comprising a biometric authentication unit configured to identify one or more subjects based on the at least one iris detected within the first face or the at least one iris detected within the second face.

9. The image processing system of claim 1, wherein the system is configured to operate in a first working mode where the face detector is configured to detect the first face and the second face at spatially non-coincident locations within said first and second image planes respectively.

10. The image processing system of claim 9, being configured, when switching from the first working mode to a second working mode, to adjust:
at least one of the intensity of the first NIR light, the gain of the first sub-pixels and the image acquisition period, in such a way that the first face is properly exposed within the first image plane; or
at least one of the intensity of the second NIR light, the gain of the second sub-pixels and the image acquisition period, in such a way that the second face is properly exposed within the second image plane.

11. The image processing system of claim 1, wherein the system is configured to operate in a second working mode where the face detector is configured to detect the first face and the second face at a spatially coincident location within said first and second image planes.

12. The image processing system of claim 11, further comprising a heart rate pulse monitoring unit configured to analyse at least a first differential signal indicative of a difference in illumination between the detected first and second faces over a sequence of image acquisition periods.

13. The image processing system of claim 12, wherein the at least one image sensor is further configured to acquire, at each image acquisition period, a third image plane from a group of third sub-pixels of the array of pixels, the third sub-pixels being selectively sensitive to a visible light band,
the system further comprising at least one visible light source capable of emitting light corresponding to the visible light band,
the face detector being configured to detect a face within the third image plane at a location coincident with one of the first and second faces, and
the heart rate pulse monitoring unit is further configured to analyse at least a second differential signal indicative of a difference in illumination between the detected third face and at least one of the detected first and second faces, over said sequence of image acquisition periods.

14. The image processing system of claim 1 wherein said at least one image sensor is arranged to operate in a rolling shutter mode where each of said image planes is acquired for a common integration time.

15. One of a portable electronic device or a vehicle occupant monitoring system including the image processing system according to claim 1.

16. An image processing system comprising:
at least one image sensor comprising a plurality of pixels, each pixel comprising a plurality of sub-pixels, and configured to provide, during an image acquisition period, a first image plane from a group of first sub-pixels selectively sensitive to a first NIR light band and a second image plane from a group of second sub-pixels selectively sensitive to a second NIR light band, wherein the sensitivity of the first sub-pixels to the first NIR light is greater than the sensitivity of the second sub-pixels to the second NIR light band, and the number of first sub-pixels is greater than the number of second sub-pixels;
at least one NIR light source capable of separately emitting first NIR light corresponding to the first NIR light band and second NIR light corresponding to the second NIR light band, the first NIR light having a higher intensity than the second NIR light; and
a face detector;
the system being configured to operate according to at least a first working mode where the face detector is configured to detect at least a first face in the first image plane and a second face in the second image plane at a spatially non-coincident location to the first face, wherein the first face is a face of a first person and the second face is a face of a second person, different from the first person.

17. One of a portable electronic device or a vehicle occupant monitoring system including the image processing system according to claim 16.

18. An image processing system comprising:
at least one image sensor comprising a plurality of pixels, each pixel comprising a plurality of sub-pixels, and configured to provide, during an image acquisition period, a first image plane from a group of first sub-pixels selectively sensitive to a first NIR light band and a second image plane from a group of second sub-pixels selectively sensitive to a second NIR light band;
at least one NIR light source capable of separately emitting first NIR light corresponding to the first NIR light band and second NIR light corresponding to the second NIR light band, the first NIR light having a higher intensity than the second NIR light;
a face detector configured to detect a first face from the first image plane and a second face from the second image plane at a spatially coincident location, wherein the first face is a face of a first person and the second face is a face of a second person, different from the first person; and
a heart rate pulse monitoring unit configured to analyse at least a differential signal indicative of a difference in illumination between the detected first and second faces over a sequence of image acquisition periods.

19. One of a portable electronic device or a vehicle occupant monitoring system including the image processing system according to claim 18.

* * * * *